United States Patent
Ellwanger

(10) Patent No.: US 10,259,378 B2
(45) Date of Patent: Apr. 16, 2019

(54) LAMP ASSEMBLY HAVING REAR LAMPS AND AN ILLUMINATED DECORATIVE STRIP

(71) Applicant: DAIMLER AG, Stuttgart (DE)

(72) Inventor: Oliver Ellwanger, Weinstadt (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 15/780,749

(22) PCT Filed: Nov. 17, 2016

(86) PCT No.: PCT/EP2016/001913
§ 371 (c)(1),
(2) Date: Jun. 1, 2018

(87) PCT Pub. No.: WO2017/092844
PCT Pub. Date: Jun. 8, 2017

(65) Prior Publication Data
US 2018/0264991 A1  Sep. 20, 2018

(30) Foreign Application Priority Data

Dec. 5, 2015 (DE) .......................... 10 2015 015 841

(51) Int. Cl.
*B60Q 1/30* (2006.01)
*F21S 43/14* (2018.01)
(Continued)

(52) U.S. Cl.
CPC .......... *B60Q 1/0041* (2013.01); *B60Q 1/302* (2013.01); *B60R 13/04* (2013.01); *F21S 43/14* (2018.01);
(Continued)

(58) Field of Classification Search
CPC ...... B60Q 1/0041; B60Q 1/302; B60R 13/04; F21S 43/14; F21S 43/26; F21S 43/237; F21S 43/245
See application file for complete search history.

(56) References Cited

U.S. PATENT DOCUMENTS

| | | | |
|---|---|---|---|
| 6,037,865 A | 3/2000 | Heinz et al. | |
| 2012/0280528 A1 | 11/2012 | Dellock et al. | |
| 2013/0314935 A1 | 11/2013 | Tokieda et al. | |
| 2013/0335997 A1* | 12/2013 | Roberts | G09F 21/04 362/583 |
| 2014/0003075 A1 | 1/2014 | Yamada et al. | |
| 2015/0323149 A1 | 11/2015 | Salter et al. | |

FOREIGN PATENT DOCUMENTS

DE  9107741 U1  10/1991
DE  19749047 A1  5/1998
(Continued)

OTHER PUBLICATIONS

International Search Report dated Jan. 20, 2017 in related International Application No. PCT/EP2016/001913.
Written Opinion dated Jan. 20, 2017 in related International Application No. PCT/EP2016/001913.

*Primary Examiner* — Thomas M Sember
(74) *Attorney, Agent, or Firm* — Patent Portfolio Builders PLLC

(57) ABSTRACT

A light arrangement includes two vehicle rear lamps and an illuminated decorative strip, which are aligned to each other both functionally and creatively. The decorative strip has a light outlet provided with a covering glass, under which an is optical fiber. The covering glass is provided on the outside with a translucent chromium foil and the base body of the decorative strip is chromium-plated on its surface. The optical fiber, the lighting source, the controller of the lighting light source, and the connections for the power supply are integrated into the base body of the decorative strip.

(Continued)

Figure 1:
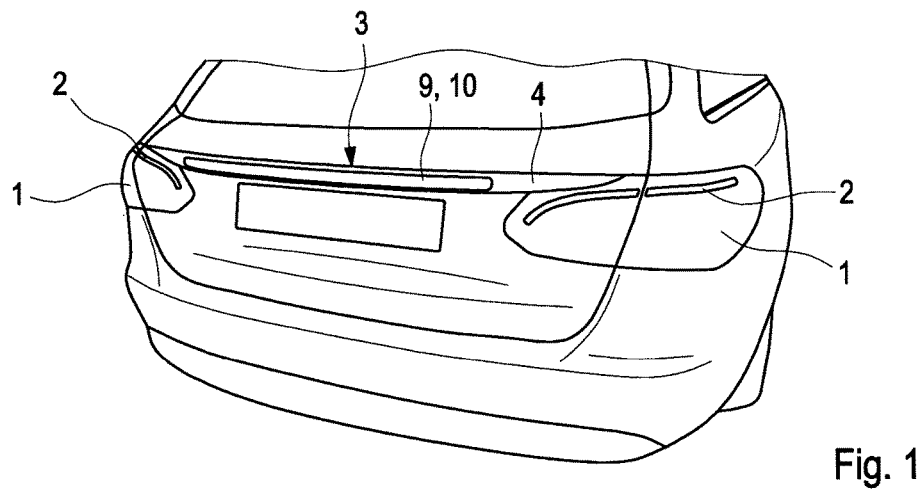

Color selection can be adjusted by the controller of the lighting source so that the light and intensity of the color selection supplied to the optical fiber can be aligned with that of the rear lamps.

12 Claims, 2 Drawing Sheets

(51) Int. Cl.
    *F21S 43/20*         (2018.01)
    *F21S 43/237*      (2018.01)
    *F21S 43/245*      (2018.01)
    *B60Q 1/00*         (2006.01)
    *B60R 13/04*       (2006.01)

(52) U.S. Cl.
    CPC ........... *F21S 43/237* (2018.01); *F21S 43/245* (2018.01); *F21S 43/26* (2018.01)

(56) References Cited

FOREIGN PATENT DOCUMENTS

| | | |
|---|---|---|
| DE | 19745993 A1 | 4/1999 |
| DE | 10319396 A1 | 11/2004 |
| DE | 102012018447 A1 | 3/2014 |
| DE | 102012025490 A1 | 6/2014 |
| DE | 102014016250 A1 | 6/2015 |
| EP | 2746106 A1 | 6/2014 |
| FR | 3016148 A1 | 7/2015 |

\* cited by examiner

LAMP ASSEMBLY HAVING REAR LAMPS AND AN ILLUMINATED DECORATIVE STRIP

BACKGROUND AND SUMMARY OF THE INVENTION

Exemplary embodiments of invention relate to a light arrangement, in particular for the rear of a vehicle, having two controllable rear lamps and a controllable, illuminated decorative strip, and a decorative strip provided with a lighting means, the decorative strip being adapted in a particular manner for the light arrangement.

A decorative strip having a back lamp is known from German patent document DE102012025490 A1, paragraphs 24 and 44. The back lamp is located behind the decorative strip, seen from the visible side. The decorative strip itself has a metallic surface that is applied by vapor deposition with aluminum or chromium. The layer thickness is chosen such that a transillumination of the layer is possible with the lighting means. The strip base body is made from plastic. The decorative strip includes the corresponding assembly means, in order to fasten it to the bumper of the vehicle. Furthermore, the illumination of the decorative strip can be controlled. The lighting means is controlled by proximity sensors installed in the bumper. A background illumination at the rear of the vehicle is thus achieved, which switches on when a vehicle user approaches the rear and, for example, wants to open the rear cover or the trunk of the vehicle.

An accessory for a vehicle is known from German patent document DE 10 2014 016250 A1. The accessory serves for the indirect side illumination of the vehicle and illuminates the vehicle door, the vehicle running board or the side skirt of the vehicle. The illumination itself takes place with an optical fiber element, into which light from a lighting means is integrated. A so-called ambient illumination of the vehicle is accomplished with the accessory. The accessory also assumes the function of a decorative strip. The lighting itself may, however, have no direct radiation for other road users, rather may only be visible via indirect illumination. The problem of transillumination of a chromium-plated decorative strip therefore does not exist with ambient illumination.

The above-mentioned illuminated decorative strips thus fulfil respective independent lighting tasks. An adaptation to the rear lamps of the vehicle or an interaction of the lighting of the rear lamps and a decorative strip is not known therefrom.

Exemplary embodiments of the invention are directed to a light arrangement for the rear illumination of a vehicle, in which an illuminated decorative strip lights up together with the rear lamps, and rear lamps and decorative strip enable a creative and functional design element for the rear of the vehicle by day and by night.

According to an embodiment, a light arrangement involves two vehicle rear lamps and an illuminated decorative strip, which are aligned to each other both functionally and creatively. For this purpose, the decorative strip has a light outlet provided with a covering glass, under which an optical fiber is guided. The covering glass is provided with a translucent chromium foil from the outside. The base body of the decorative strip is likewise chromium-plated on its surface. The optical fiber, the lighting means and the control of the lighting means as well as the connections to the power supply are integrated into the base body of the decorative strip. Power supply and control of the optical fiber are coupled to the power supply and the control of the rear lamps. Here, the coupling relates to temporal coupling with regards to the joint lighting-up. Furthermore, the color selection, which can be adjusted by the control of the lighting means and is fed into the optical fiber, can be aligned to the rear lamps with regards to intensity and color impression.

Thus, the following advantages can be achieved: The design of the vehicle rear can be enhanced with a decorative strip aligned to the rear lamps. The decorative strip can be adjusted with regards to intensity and color selection independently of the control of the rear lamps of the vehicle by the decorative strip having its own control for intensity and color selection of the lighting means, and thus for the color impression appearing through the translucent chromium foil from the outside. This is important, as the color impression appearing from the outside is affected by the translucent chromium foil. The perceptible light intensity from the outside thus cannot simply be taken over or derived from an intensity adjustment of the rear lamps. In the day design, when rear lamps and decorative strip are not illuminated, the decorative strip furthermore fulfils its decorative function through the chromium plating of the decorative strip base body and the translucent chromium foil applied to the covering glass. The decorative strip in the illuminated state can be clearly offset from the third brake rear lamp of a vehicle by the adjustable color selection. The decorative strip can be aligned in intensity in its perception both to the ambient light conditions and to the perception of the rear lamps.

In an embodiment of the invention, the separated controls for the lighting means of the decorative strip and a rear lamp are in separate control units. A control unit is thus integrated in the decorative strip and a control unit is integrated into each rear lamp. This has advantages mainly in the production or assembly of the vehicles on the manufacturer's belt. Decorative strip and rear lamps can be manufactured, set, programmed and delivered by different manufacturers and finally delivered to the belt as components for assembling on the vehicle, the components being fully functional and already aligned to one another.

In another embodiment of the invention, both decorative strip and rear lamps have their own control units and their own control programs; however, the coordination of the aligned color selection and the intensity control takes place only from the control unit of the rear lamps. For this purpose, a program module is then implemented in the control unit, the module coordinating the two control units of decorative strip and rear lamp. This has advantages when the vehicle manufacturer wants to do most of the alignment themselves. The number of control units to be flashed can be thus be reduced, in particular in the case of flashing the control units on the manufacturing belt, if flashing is carried out personally. However, there is also the possibility of the control units being delivered to the belt already flashed. Then, of course, the aforementioned variant of consistently independent control has advantages.

In another embodiment of the invention, the rear lamps have an additional design element corresponding in shape and color to the decorative strip in the illuminated state. This can be an optical fiber incorporated into the rear lamp covering, whose color and light intensity can be adjusted by the control unit. This increases the uniform perception of the light arrangement of rear lamps and illuminated decorative strip and thus reduces, if necessary, irritation of other road users. In particular, it further reduces the likelihood of confusion of the illuminated decorative strip and the third brake light. If necessary, a joint functional and design element in rear lamps and decorative strip also enables the joint registration of the light arrangement during the vehicle registration. Advantageously, a new light functionality can be achieved by an aligned, respectively illuminated design element in rear lamps and decorative strip. For example, a daytime running light for the vehicle rear can be accomplished by the joint design elements.

In an embodiment of the invention, so-called RGB LEDs are used as lighting means. In other words, these are three light-emitting diodes having the base colors of red, green and blue, which are attached together on a board having associated control electronics and feed their light into the optical fiber of the decorative strip. By changing the color composition or changing the individual light intensities of the individual colors, a color selection can be achieved which, after passing through the translucent chromium foil, corresponds to the color impression of individual design elements in the rear lamps. A color selection for the decorative strip can also be advantageously set, which differs significantly from the red of the brake light function. If necessary, manufacturers can make specific color compositions having a higher recognition value. This enables a manufacturer to set a specific color selection which, if it prevails, indicates the vehicle make or the vehicle manufacturer.

In an embodiment of the invention, the light arrangement consists of two rear lamps and a decorative strip having two optical fibers, wherein each rear lamp is coupled to an optical fiber.

In another embodiment, the light arrangement consists of two rear lamps and a decorative strip having an optical fiber, wherein the optical fiber is only coupled to a rear lamp.

In a further embodiment, the optical fiber consists of two respectively divided rear lamps and two illuminated decorative strips coupled to the parts of the rear lamps, the rear lamps being located on the rear cover of the vehicle to which the two decorative strips are attached.

In a further embodiment, the light arrangement consists of two respectively divided rear lamps and an illuminated decorative strip, wherein the decorative strip is coupled to a part of the rear lamps that is located on the rear cover together with the decorative strip.

BRIEF DESCRIPTION OF THE DRAWING FIGURES

Further details are contained in the drawings and will be described in more detail in the following.

Figure 2:
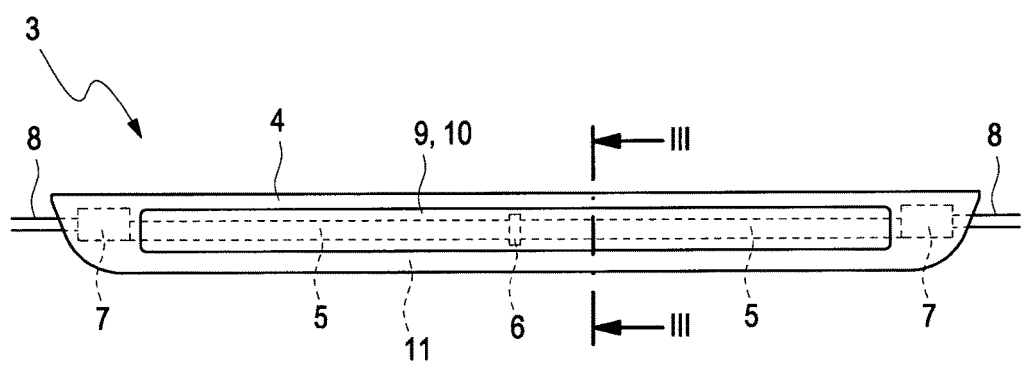
Figure 3:
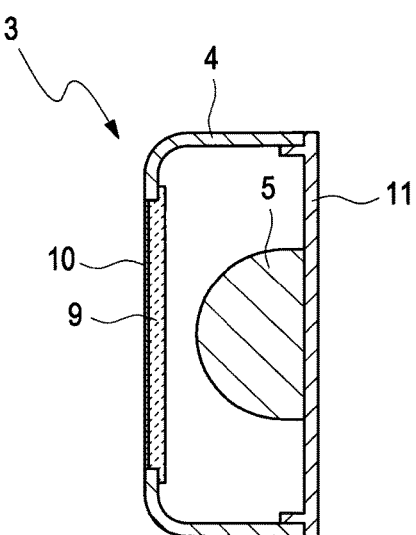
Figure 4:
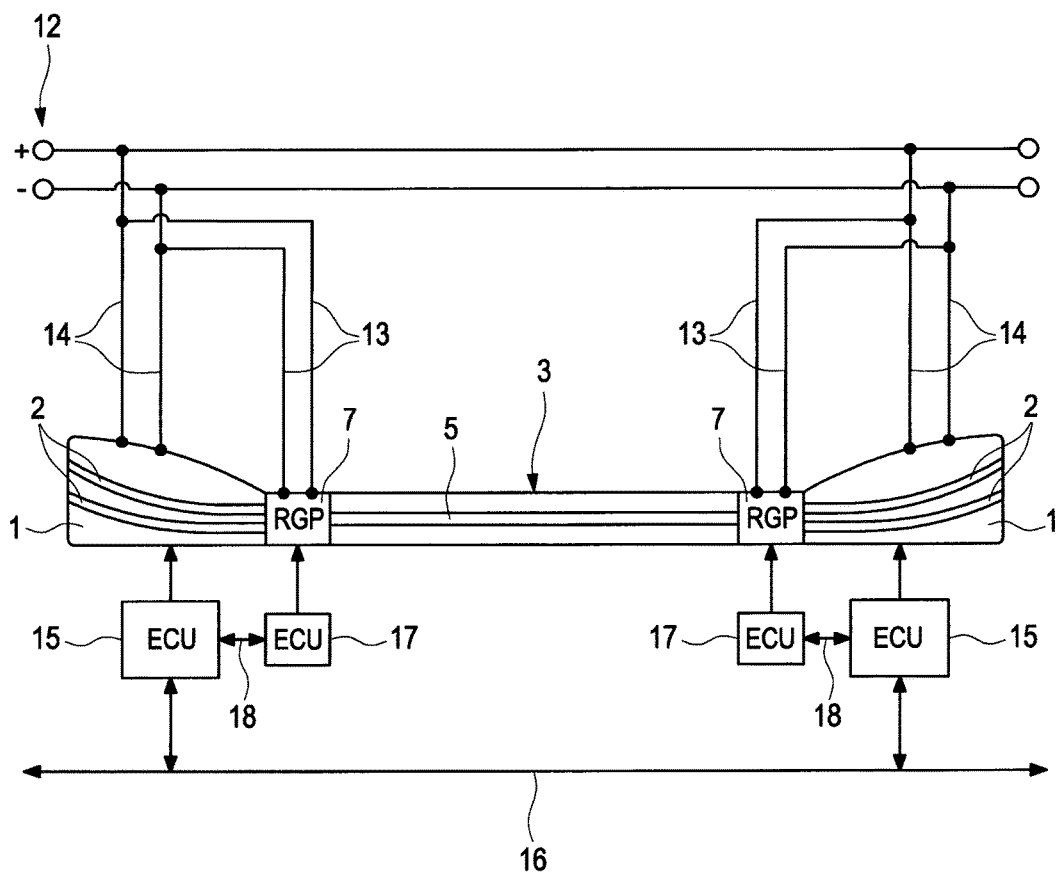

Here are shown:

FIG. 1 by way of example, a prototype of the light arrangement according to the invention on the rear of a vehicle, FIG. 2 a schematic depiction of the decorative strip according to the invention in a top view, FIG. 3 a cross-section through the decorative strip of FIG. 2 according to the invention, FIG. 4 a block diagram of the light arrangement according to the invention having the most important technical units for operating the light arrangement.

DETAILED DESCRIPTION

FIG. 1 shows the depiction of a prototype of the invention which has been constructed to be functional and shows the most important functional design elements which are visible on the rear of the vehicle. The light arrangement consists of two rear lamps 1 divided into two, having additional decorative elements 2 and a decorative strip 3 between the two rear lamps. The decorative strip and the decorative elements correspond to one another in their design vocabulary and are aligned to one another in color. The decorative strip is arranged horizontally between the two rear lamps on the rear lid of the vehicle, extends the upper edge of the rear lamps and thus connects these to each other in optical effect. Preferably, the decorative strip is positioned on the horizontal bead of the rear lid and the upper edges of the rear lamps are likewise oriented towards this bead. Two effects and two advantages are thus achieved. First, the integral rear view of the vehicle has a calm and tidy effect and second, the decorative strip supports the design effect of the horizontal bead in the rear lid. Thus, no change in design of the rear lid of the vehicle is required and the vehicle manufacturer can offer the decorative strip as optional vehicle equipment. A second advantage lies in the improved recognition of the vehicle in twilight and at night. The design impression of the rear lid and thus of the vehicle is co-determined during the day by the chromium-plated decorative strip and the decorative elements in the rear lamps, and in twilight and at night, when the rear lamps are switched on, it is extended by the illumination of the decorative strip and the decorative elements in the rear lamps. The day design of the vehicle is echoed and continued by the night design. The recognition pattern during the day from the chromium-plated decorative strip and decorative elements is carried on at night by the same chromium-plated decorative strip and decorative elements, this time visible from the outside through the transillumination of the chromium-plated decorative strip and decorative elements.

FIG. 2 goes into more detail about the structure of the decorative strip 3. The decorative strip consists of a carrier body 4 made of plastic, onto which or into which the further technical units are integrated. In the depicted alternative, there are, in detail, two optical fibers 5 extending over as great as possible a length of the carrier body and collide in the longitudinal direction in the center 6 of the carrier body with as few gaps as possible. Each of the optical fibers 5 has its own light feed 7. The light feed consists of an electronic circuit board on which three light-emitting diodes in the base colors of red, green, blue—so-called RGB LEDs—are applied with their color-specific intensity control and voltage supply. The cable connections 8 of the electronic circuit board are guided outwards by the carrier body. In a preferred embodiment, the electronic circuit board contains its own microprocessor and is thus formed as a complete control unit for the light feed into the optical fiber 5. In this alternative, optical fiber, control electronics of the RGB LEDs, and RGB LEDs themselves are integrated into the decorative strip. This alternative has the advantage that the decorative strip can be configured as a fully operable component, can be assigned by the vehicle manufacturer as such, and can be delivered to the manufacturing belt of the vehicle manufacturer by the decorative strip manufacturer as a fully programmed and flashed component. The control program/s is/are then stored together with the control parameters in a data memory in the microprocessor of the electronic circuit board or in a separate memory module on the electronic circuit board.

In another alternative embodiment, the intensity control of the RGB LEDs on the electronic circuit board is taken over by a control unit outside the decorative strip. This offers pricing advantages for the production costs of the decorative strip, but it requires a deeper understanding in the control of the LEDs from the automobile manufacturer, they must then make more effort at this interface.

The carrier body is chromium-plated on the regions that are visible in the assembled state. In order to enable a light outlet from the optical fibers, a glass covering plate 9 is embedded into the carrier body on the visible side, behind which the optical fibers run. The covering plate is provided with a translucent chromium foil 10 on its visible side or outer side. A suitable chromium foil is, for example, the translucent high-gloss foil Scotchcall of the company 3M. Scotchcall is the trademarked name for the chromium foil. Product description, product properties and application properties of the chromium foil are given by the company 3M under the product number 7755-520. Two properties are important in connection with the decorative strip: First, in the non-illuminated state, the decorative strip is visible as a chromium strip. This means that the embedded covering glass cannot be differentiated from the likewise chromium-plated carrier body in this state. Second, in the illuminated state of the optical fiber, the translucent property of the chromium foil is important. Suitable foil strengths and suitable strengths of chromium layers are specified, for example, in the datasheets for the chromium foil.

FIG. 3 shows a cross-section through the decorative strip from FIG. 2. The chromium-plated carrier body 4 with the covering glass 9 onto which the chromium foil 10 is applied are depicted. The optical fiber 5 runs underneath the covering glass inside the carrier body 4. The decorative strip has a rearward fastening plate 11 for fastening the decorative strip to the vehicle body.

FIG. 4 shows a further alternative for a light arrangement according to the invention and a block diagram as an example of the power supply and the control of the light arrangement. In contrast to the light arrangement in FIG. 1, this alternative uses single-piece rear lamps 1. In each case, this is a single-piece rear lamp for the port and starboard sides of the vehicle lights. In this alternative, each of these rear lamps has two decorative elements 2 corresponding to the decorative strip. In each of the possible embodiments for the rear lamps—single-piece or two-piece—the rear lamps can have one or more, preferably two or three, decorative elements. The decorative strip 3 is formed to positively fit the rear lamps and connects these to a uniform light arrangement. The light feeds 7 for the optical fibers 5 of the decorative strip are depicted here enlarged by way of example and positioned directly on the rear lamps. The light feed itself takes place with so-called RGB LEDs. In the actual implementation of the invention, the light feeds, of course, cannot be seen from the outside, but rather are integrated inside the decorative strip. The depiction of the prototype in FIG. 1 shows an image that is closer to the invention as far as the optical effect is concerned. In particular, the light feeds 7 can also be arranged behind the optical fiber, seen from the visible side, such that the optical fiber runs over the entire length of the decorative strip and, in the illuminated state, is also positioned to positively fit the decorative elements of the rear lamp. The number of optical fibers employed in a decorative strip can be adapted to the illumination needs and the creative design vocabulary. Either a one-piece optical fiber over as long a length as possible of the decorative strip or two divided optical fibers, each having their own light feed for each of the optical fibers, have proved effective. The latter embodiment is already shown in FIG. 2. Here in FIG. 4, an alternative having an optical fiber and two light couplings 7 on each end of the optical fiber is depicted. Both alternatives from FIG. 2 and FIG. 4 have the advantage of as even as possible illumination of the decorative strip.

Advantageously, the light feeds or light couplings with their electrical and electronic components are positioned in as direct proximity as possible to the rear lamps. This has the advantage that the connecting lines for power supply and grid link to the communication on-board electrical system of the vehicle can be kept as short as possible. The decorative strip is particularly attached to the on-board electrical system links of the rear lamps. The laying down of additional power supplies or additional communication bus lines is thus not required.

The on-board electrical system links and the participating control units in FIG. 4 have been specially removed for depiction purposes. In reality, the lines and control units are integrated into the rear lamps and or decorative strip. The rear lamps, left and right, are respectively attached to the on-board electrical system voltage 12. The voltage supply 13 for the light feeds 7 of the decorative strip is derived from the voltage supply 14 of the rear lamps. The voltage supply mainly serves for energy supply for the lighting means in the rear lamps and in the decorative strip. In the decorative strip, the lighting means are the light diodes employed (RGB LEDs).

The control of the lighting means in the rear lamps takes place with the control units 15 which are provided for this. The rear lamps control units are attached to the communication network 16, which is formed, for example, by a CAN bus.

The control of the intensity adjustment and the color mixing for the RGB LEDs in the decorative strip takes place, depending on the alternative already discussed above, either directly from the control unit 15 of the rear lamps, if the decorative strip does not have its own intelligent electronic control system, or via its own decorative strip control unit 17. The decorative strip control unit 17 is then preferably applied as a computer module to the circuit board for the light-emitting diodes and their intensity and color adjustment.

The link of the decorative strip control unit to the communication network of the vehicle can, in principle, take place directly on the bus 16, though a link 18 to the control unit 15 of the rear lamps is expediently selected. This saves the laying down of additional bus leads in the vehicle and enables the use of simpler and more cost-effective communication technology. For example, a LIN bus 18 can be employed between the rear lamp control unit and the decorative strip control unit. Most especially advantageously, the connecting cable can also be employed for the voltage supply of the decorative strip for transmitting communications between rear lamps control unit and decorative strip control unit.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A vehicle light arrangement, comprising:
   two rear lamps; and
   an illuminable decorative strip positioned between the two rear lamps, wherein the illuminable decorative strip comprises
   a chromium-plated carrier body;
   a illuminable covering plate, which is coated with a translucent chromium foil and is on a visible side of the illuminable decorative strip; and
   at least one optical fiber is positioned underneath the illuminable cover plate, wherein a color of light fed into the at least one optical fiber is adjustable so that the illuminable decorative strip is differentiated from a third brake light of the vehicle by color.

2. The vehicle light arrangement of claim 1, further comprising:
   separate controllers for the illuminable decorative strip and the two rear lamps.

3. The vehicle light arrangement of claim 1, wherein the illuminable decorative strip and the two rear lamps are operated using separate control programs.

4. The vehicle light arrangement of claim 1, wherein the illuminable decorative strip is controlled by a control program in one of the two rear lamps.

5. The vehicle light arrangement of claim 1, wherein each of the two rear lamps have at least one decorative element corresponding in shape and color to the illuminable decorative strip.

6. The vehicle light arrangement of claim 1, further comprising:
   red, green, and blue light-emitting diodes coupled to the at least one optical fiber.

7. The vehicle light arrangement of claim 1, wherein the vehicle light arrangement consists of the two rear lamps and the illuminable decorative strip, which has two optical fibers.

8. The vehicle light arrangement of claim 1, wherein the vehicle light arrangement consists of the two rear lamps and the illuminable decorative strip, which has a single optical fiber.

9. The vehicle light arrangement of claim 1, wherein the two rear lamps each consist of two divided rear lamps.

10. The vehicle light arrangement of claim 1, wherein the illuminable decorative strip is coupled to the two rear lamps at a location on a rear cover of the two rear lamps together with the illuminable decorative strip.

11. A vehicle decorative strip for a light arrangement, the vehicle decorative strip comprising:
    a chromium-plated carrier body;
    an illuminable covering plate on a visible side of the vehicle decorative strip, wherein the illuminable covering plate is coated with a translucent chromium foil; and
    at least one optical fiber positioned underneath the illuminable covering plate, wherein a color of light fed into the at least one optical fiber is adjustable so that the illuminable decorative strip is differentiated from a third brake light of the vehicle by color.

12. The vehicle decorative strip of claim 11, further comprising:
    a light feed coupled to the at least one optical fiber and positioned on one end of the vehicle decorative strip.

* * * * *